US012775953B1

(12) United States Patent
Serrao et al.

(10) Patent No.: US 12,775,953 B1
(45) Date of Patent: Oct. 27, 2026

(54) SYSTEMS AND METHODS FOR PROVIDING A ROLLING AUTHENTICATION CODE

(71) Applicant: United Services Automobile Association (USAA), San Antonio, TX (US)

(72) Inventors: Nolan Serrao, Plano, TX (US); David Joaquin Harris, San Antonio, TX (US); Qunying Kou, San Antonio, TX (US); Gideon Bowie Luck, Plano, TX (US); Nickolaus Wayne O'Neal, San Antonio, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 45 days.

(21) Appl. No.: 18/415,453

(22) Filed: Jan. 17, 2024

Related U.S. Application Data

(60) Provisional application No. 63/439,718, filed on Jan. 18, 2023.

(51) Int. Cl.
*G06Q 20/40* (2012.01)
*H04L 9/32* (2006.01)

(52) U.S. Cl.
CPC ....... *G06Q 20/4018* (2013.01); *H04L 9/3228* (2013.01)

(58) Field of Classification Search
CPC .......................... G06Q 20/4018; H04L 9/3228
See application file for complete search history.

(56) References Cited

U.S. PATENT DOCUMENTS

| | | | | |
|---|---|---|---|---|
| 7,742,967 | B1 * | 6/2010 | Keresman, III | G06Q 40/04 705/37 |
| 7,860,786 | B2 * | 12/2010 | Blackburn | G06Q 40/03 705/38 |
| 8,712,807 | B2 * | 4/2014 | Walker | G06Q 40/125 705/35 |
| 8,775,307 | B2 * | 7/2014 | McLaughlin | G06Q 10/10 705/40 |
| 10,074,138 | B2 * | 9/2018 | Hughes | G06Q 40/08 |
| 10,628,891 | B2 * | 4/2020 | Marcia | G06Q 40/12 |
| 10,735,398 | B1 * | 8/2020 | Covati | H04L 63/0838 |
| 11,257,085 | B1 * | 2/2022 | Barkas | G06Q 20/3829 |
| 11,395,139 | B1 * | 7/2022 | Paczkowski | H04W 12/12 |
| 11,599,873 | B2 * | 3/2023 | Campos | G06Q 20/3674 |
| 11,601,279 | B2 * | 3/2023 | Johnson | H04L 9/3213 |

(Continued)

FOREIGN PATENT DOCUMENTS

| | | | | |
|---|---|---|---|---|
| CA | 2839287 | A1 * | 1/2013 | A61B 5/002 |
| EP | 4664430 | A1 * | 12/2025 | G07C 9/00309 |

(Continued)

*Primary Examiner* — Daniel S Felten
(74) *Attorney, Agent, or Firm* — Fletcher Yoder, P.C.

(57) ABSTRACT

Systems and methods for providing a rolling code verification retrofit for existing payment systems are provided. A rolling code is generated for a verification data type captured by the payment system, while an actual value of the data type is retained. The rolling code is used for authentication of a transaction request, while the actual value continues to be used for other functions.

11 Claims, 4 Drawing Sheets

(56) References Cited

U.S. PATENT DOCUMENTS

| | | | | |
|---|---|---|---|---|
| 11,756,043 | B1 * | 9/2023 | Massie | G06Q 20/405 705/44 |
| 11,915,221 | B2 * | 2/2024 | Christensen | G06Q 20/204 |
| 12,206,784 | B2 * | 1/2025 | Johnson | G06Q 20/4014 |
| 12,333,533 | B1 * | 6/2025 | Osterkamp | G06Q 20/3821 |
| 2009/0240609 | A1 * | 9/2009 | Cho | G06Q 40/02 705/30 |
| 2012/0046974 | A1 * | 2/2012 | Eshleman | G06Q 30/06 705/500 |
| 2012/0143754 | A1 * | 6/2012 | Patel | G06Q 20/385 705/41 |
| 2012/0317014 | A1 * | 12/2012 | Cerise | G06Q 40/03 705/38 |
| 2013/0013331 | A1 * | 1/2013 | Horseman | A61B 5/0022 705/2 |
| 2013/0282544 | A1 * | 10/2013 | Feinschreiber | G06Q 10/1057 705/35 |
| 2014/0163336 | A1 * | 6/2014 | Horseman | A61B 5/0205 600/301 |
| 2016/0117779 | A1 * | 4/2016 | Sale | G06F 16/2308 705/4 |
| 2017/0032369 | A1 * | 2/2017 | Hugot | G06Q 20/3825 |
| 2017/0193500 | A1 * | 7/2017 | Hugot | G06Q 20/425 |
| 2017/0310653 | A1 * | 10/2017 | Zhang | H04L 63/0838 |
| 2018/0108017 | A1 * | 4/2018 | Wilson | G06Q 20/385 |
| 2020/0058024 | A1 * | 2/2020 | Muller | G06Q 30/06 |
| 2020/0301467 | A1 * | 9/2020 | Leroy | G06F 1/14 |
| 2020/0410600 | A1 * | 12/2020 | Guillen | G01S 19/51 |
| 2021/0110383 | A1 * | 4/2021 | Hamasako | G06Q 20/3276 |
| 2021/0206350 | A1 * | 7/2021 | Henderson | H04W 4/023 |
| 2022/0270096 | A1 * | 8/2022 | Bhasin | H04W 12/47 |
| 2023/0412367 | A1 * | 12/2023 | Bennison | H04L 63/0807 |

FOREIGN PATENT DOCUMENTS

| | | | | | |
|---|---|---|---|---|---|
| GB | 2578733 | A | * | 5/2020 | G06Q 40/03 |
| WO | WO-2010126940 | A1 | * | 11/2010 | G06Q 40/08 |
| WO | WO-2013006636 | A2 | * | 1/2013 | A61B 5/002 |

* cited by examiner

SYSTEMS AND METHODS FOR PROVIDING A ROLLING AUTHENTICATION CODE

CROSS REFERENCE TO RELATED APPLICATION

The present disclosure is related to, and claims priority to U.S. Provisional Patent Application No. 63/439,718, titled "SYSTEMS AND METHODS FOR PROVIDING A ROLLING AUTHENTICATION CODE," which was filed on Jan. 18, 2023, and which is herein incorporated by reference in its entirety for all purposes.

BACKGROUND

The present disclosure relates generally to systems and methods for fraud detection and prevention. More specifically, the present disclosure relates to providing a retrofit rolling code solution to verify a transaction, thereby reducing or eliminating service card fraud.

Service cards, such as credit and debit cards, make transactions convenient for consumers. However, payment systems accepting service cards may be hacked and payment information may be stolen, thereby exposing the consumer to fraud. For example, skimming devices may be coupled to a point of sale terminal to record service card information, which may give an unauthorized party access to service card information and/or personal information. The consumer may be notified of the unauthorized access only when the consumer receives indication of unauthorized charges, which may be well after the unauthorized charges were made. As a result, the consumer may be burdened with steep bills and/or lowered credit scores.

Traditional approaches to fraud mitigation have included prompting a user for additional information to verify that the user is the user authorized to make the transaction. Unfortunately, however, the information requested is often limited by the hardware and/or software of the device that provides the prompt for information. For example, when prompting for additional information at a point of sale (POS) device, such as a gas pump, the gas pump may be limited (e.g., based upon hardware and/or software) to prompting for a billing zip code in certain instances (e.g., when using a credit card). As may be appreciated, residence addresses may be easily obtainable from online and/or offline directories, causing this fraud mitigation technique to be weak. That is, the requested information may be obtainable by bad-actors, as the information requested is typically static and available in the public domain. As such, systems and methods for stronger fraud mitigation techniques are desirable, even for electronic devices that may have hardware and/or software implementation limitations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Current embodiments relate to providing enhanced (e.g., improved) fraud mitigation techniques to electronic devices with hardware and/or software implementation limitations that may prevent variable fraud mitigation information prompting and/or gathering. A rolling code mitigation technique may be implemented by artificially changing values of information that these limited electronic devices are designed to prompt for even when the prompting devices may not modified to handle prompting for dynamically changing data (e.g., that are instead designed to prompt for particular information associated with the user that typically remains static for long periods of time, such as the user's zipcode). To implement this technique, an additional data field storage may be provided. For example, a first field may store a true value (e.g., the user's actual zip code) that is used for functions requiring the true value and a second filed used for storage of the rolling value (e.g., a non-true zip code value that changes periodically) that is compared against data captured by the information prompt to verify the user at a particular point in time. In this manner, the prompting device may continue to use a designed data capture prompt, while the authentication system may validate using rolling/temporary codes, even when the data capture prompt pertains to permanent/semi-permanent/persistent data that is not desirable to change.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
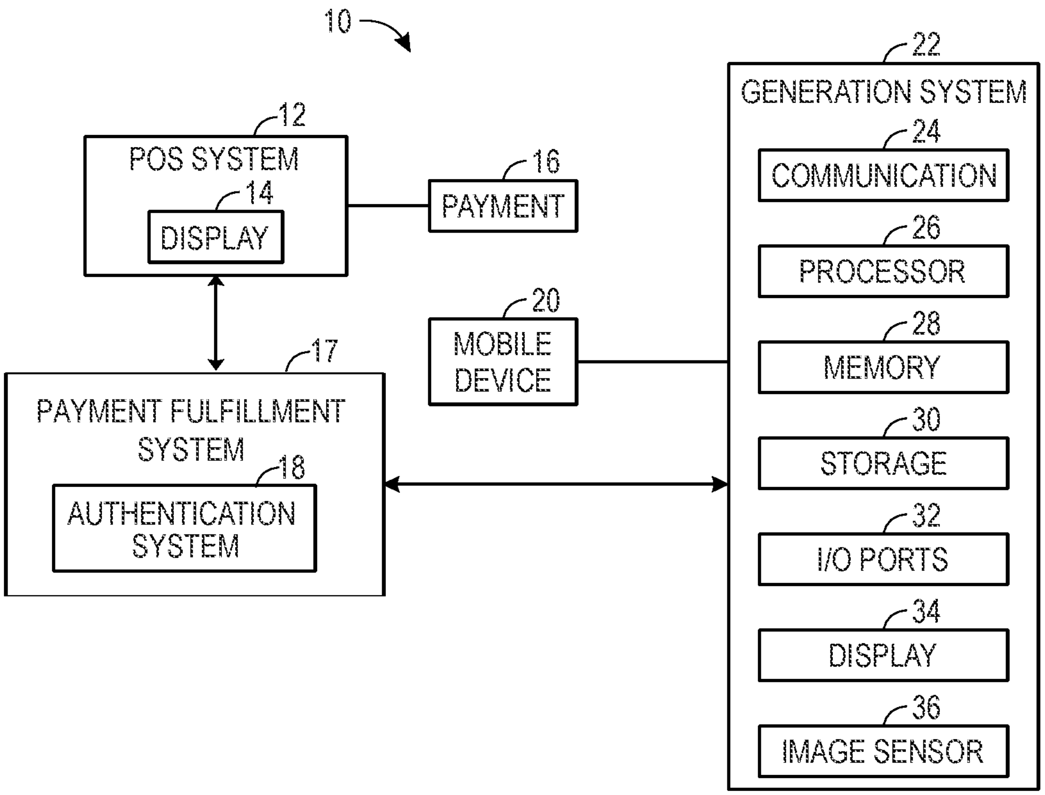
FIG. 1 is a block diagram of a generation system configured to generate and transmit a code and an authentication system configured to verify the code to approve or deny a transaction, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to providing improved fraud detection and prevention systems for service card transactions. For example, consumers may provide service card (e.g., credit card, debit card information) and/or personal information to a payment system to complete a transaction. However, the information may be obtained (e.g., stolen) by a third party and/or used for unauthorized transactions. These fraudulent actions may be detected well after the unauthorized transaction has occurred. For example, the consumer may receive fraud alerts well after a number of purchases have already been made using service card, thus burdening the consumer with steep bills and/or lowered credit scores. As such, systems and methods to reduce detection time for fraudulent transactions and/or to prevent fraudulent transactions may be desired.

Embodiments of the disclosure are directed to a generation system for reducing, eliminating, or preventing fraudulent transactions related to service cards. The generation system may provide a retrofit rolling code to verify a transaction prior to authorizing the transaction. For example, a consumer may provide a service card (e.g., debit card, credit card, gift card) for a one-time transaction. The consumer may swipe the service card at a point of sale (POS) terminal to complete the transaction. The POS terminal may ask for additional information, such as a zip code, a pin, a card verification value (CVV), a signature, or the like to verify the consumer prior to completing the transaction. To conceal certain information from unauthorized parties, the generation system may provide the retrofit rolling code to the consumer to use in place of the additional information. For example, the retrofit rolling code include a string of numbers that may change for each transaction. The consumer may receive the retrofit rolling code via an application on their mobile device and input the retrofit rolling code to verify the transaction in place of the additional requested information. For example, the consumer may enter a rolling zip code rather than their billing zip code. In this way, the personal information and/or the service card information may be concealed from the POS terminal as well as from unauthorized third parties. As such, fraudulent transactions related to service cards may be reduced, eliminated, or prevented.

In certain instances, the consumer may set up recurring transactions with a vendor using their service card information. For example, the consumer may set up an automatic payment scheme for utility bills, streaming services, subscription services, or the like. The consumer may authorize the vendor to request payment using payment information associated with the service card. For recurring transactions, the retrofit rolling codes may cause a verification issue. As such, the generation system may receive an indication that a transaction may be a recurring transaction and generate a token associated with the recurring transaction. The token may be provided with each subsequent transaction of the recurring transactions for verification. The generation system may maintain a list of recurring transactions and associated tokens for the user. The consumer may access the list via a graphic user interface (GUI). For example, the GUI may display a list of tokens and the user may change a state of the token. For example, the consumer may temporarily pause a token associated with a recurring transaction. In another example, the consumer may deactivate the token. As such, the token may be temporarily or permanently invalid. If the payment system does not receive a valid token, then the transaction may not be verified and/or approved. In this way, the generation system may reduce, eliminate, or prevent fraudulent transactions associated with recurring transactions.

By way of introduction, FIG. 1 is a block diagram of a transaction environment 10 including a POS system 12 with a display 14 and configured to receive a payment 16. The POS system 12 may be communicatively coupled to a payment fulfillment system 17 to request and verify the payment 16. The payment fulfillment system 17 may include an authentication system 18 configured to verify the payment 16. The transaction environment 10 may also include a mobile device 20 communicatively coupled to generation system 22. The mobile device 20 may receive a code associated with a transaction and/or change a state of a token. The generation system 22 may receive indication of a transaction and generate either a rolling code (e.g., one-time code, retrofit code, temporary value) or a token. The generation system 22 may be communicatively coupled to the authentication system 18 and provide the token and the payment 16 to the authentication system 18. In this way, the generation system 22 may conceal certain payment information, thereby reducing, eliminating, or preventing fraudulent transactions.

By way of example, to complete a transaction, a user may visit the point-of-sale (POS) system 12 to remit payment.

For example, the POS system 12 may be a kiosk used by the vendor to accept the payment 16, a mobile device displaying a graphical user interface (GUI) to receive the payment 16, a mobile device couple to a card reader, or the like. For example, the POS system 12 may be a kiosk at a gas station to receive payment prior to releasing gas. Additionally or alternatively, the POS system 12 may include any suitable computer device, such as a general-purpose personal computer, a laptop computer, a tablet computer, a mobile computer, and the like that includes specific computer-readable instructions. In another example, the POS system 12 may be a mobile device at a restaurant that receives the payment 16 to complete a transaction. Still in another example, the POS system 12 may include a card reader to receive information within a magnetic strip of a credit card or debit card. The POS system 12 may also include a display 14 to display prompts regarding the transaction, such as an amount of the transaction, a request for payment information, a confirmation, and so on.

In another example, the user may online shop at a website of a vendor. For example, the user may access the vendor through a browser or a software application. In this case, the POS system 12 may be a personal computer device, such as a general-purpose personal computer, a laptop computer, a tablet computer, a mobile computer, or the like. Additionally or alternatively, the POS system 12 may be a mobile device, such as a cell phone or a tablet. That is, the personal computer device may display a GUI with one or more boxes requesting payment information. For example, the GUI may display one or more boxes for the user to enter payment information to complete the transaction. The payment information may include a service card number (e.g., debit card number, credit card number, gift card number), a card verification value (CVV), a zip code, an expiration date, a billing address, or the like.

Still in another example, the user may set up recurring transactions using the POS system 12. The user may set up an automatic payment scheme to for transactions that reoccur. The transactions may include utility bills (e.g., water bill, energy bill), subscription services, streaming services, car payments, mortgage payments, insurance payments, gym memberships, or the like. For example, the user may set up automatic payments for utility bills that occur on the same date every month. An amount of the utility bills may be different each month and the vendor may request payment each month. In another example, the user may subscribe to music or video streaming services and set up automatic payments. An amount of the streaming services may be consistent from one transaction to another. Still in another example, the user may sign up for a subscription service for goods, such as make-up, meals, groceries, clothing, and so on. As such, the vendor may periodically request payment prior to rendering the services.

To complete the transaction, the user may provide the payment 16. The payment 16 may include providing an indication of payment method, such as credit cards, debit cards, gift cards, mobile payment services, bank routing information, or the like. For example, the user may provide a credit card number and an associated CVV to complete a transaction. In certain instances, a type of the service card may be associated with a security mechanism. For example, a pin may be used to verify a debit card or a zip code may be used to verify a credit card. Additionally or alternatively, the POS system 12 may request additional information to complete the transaction. For example, the POS system 12 may be kiosk at a gas station and the security mechanism may be a zip code. In another example, the POS system 12 may be a personal laptop used for online shopping or online bill payment and the security mechanism may be a zip code and/or a CVV.

The POS system 12 may request payment from the payment fulfillment system 17 to complete the transaction. The payment fulfillment system 17 may request additional information to verify the transaction. For example, the payment fulfillment system 17 may request a security mechanism to verify the payment 16. The additional information may be a zip code associated with the billing address, a CVV associated with a credit card, a pin associated with a debit card or the like. The payment fulfillment system 17 may receive an indication of the transaction as well as the payment 16. The authentication system 18 may confirm validity of the payment 16 by checking with an entity that issued the payment 16. The authentication system 18 may request the user to input a code associated with the security mechanism. For example, the authentication system 18 may request a zip code, a pin, a CVV, a signature, or the like to verify the payment 16.

By way of example, the user may use a credit card as the payment 16 at the POS system 12. The POS system 12 may transmit an indication of the transaction to the payment fulfillment system 17 as well as a request for payment. The payment fulfillment system 17 may be a company or an institution associated with the payment 16. For example, the payment fulfillment system 17 may be a bank. The payment fulfillment system 17 may receive the indication of the transaction, which may include payment information. The authentication system 18 may compare the received payment information to payment information within a database to verify the user. Then, the authentication system 18 may request additional payment information from the POS system 12, such as a zip code, a CVV, or the like. For example, the authentication system 18 may request a zip code to the POS system 12 for verification. If the user enters a zip code on the display 14 of the POS system 12 that does not match the payment information, then the authentication system 18 may not approve the transaction. If the user enters a zip code on the display 14 of the POS system 12 that does match the payment information, then the authentication system 18 may approve the transaction and funds may be withdrawn from an account of the user. In another example, the user may use a debit card as the payment 16 and the authentication system 18 may transmit a request for a pin associated with the debit card. Still in another example, the authentication system 18 may transmit a request for a CVV associated with a credit or debit card for verification. In this way, the payment fulfillment system 17 may include a security mechanism to verify the user and information regarding the payment 16.

However, in certain instances, verification information may become compromised. For example, the POS system 12 may have been tampered and the payment information may be stolen. For example, the POS system 12 may be coupled to a skimmer that also receives payment information during the transaction. In another example, the POS system 12 may be accessed by a third party (e.g., virus, keylogger, hacker, etc.) and payment information may be stolen or copied from the POS system 12. In another example, a bad actor may obtain verification information via public data sources, such as residence directories, etc. As such, it may be beneficial to conceal certain information regarding the payment 16 to reduce, eliminate, or prevent unauthorized access to the payment 16.

To this end, the user may be provided with a code (e.g., rolling code, retrofit code, token) to conceal their payment information from the POS system 12. For example, the user may receive a rolling code on the mobile device 20 from the generation system 22. The mobile device 20 may be communicatively coupled to the generation system 22 and the user may access the generation system 22 via a software application or a web browser on the mobile device 20. For example, the mobile device 20 may receive push notifications from the software application indicative of spending alerts, one or more codes, messages, updates, or the like. The code may be used to provide a stronger verification technique than simply matching a static zip code, CVV, or the pin. For example, the code may be a rolling zip code such that the user may enter the code as the zip code into the POS system 12. As such, a dynamic code, which may be far more difficult for an unauthorized third party (e.g., bad actor) to obtain, may be used in the verification process. Further, by using rolling data, the user may be assured that private information of the user is not obtained by the POS system 12 or a bad actor via the POS system 12. For example, by inputting a rolling zip code, the true zip code may be concealed from the POS system 12 and from any unauthorized parties, thereby reducing or eliminating subsequent fraudulent transactions. Additionally, the generation system 22 may maintain the true zip code and generate a rolling zip code that is different from the true zip code.

The generation system 22 may be communicatively coupled to the payment fulfillment system 17 and/or the authentication system 18 to provide the rolling code and/or overwrite the vendor's information. The generation system 22 may determine the security mechanism of the authentication system 18 and generate a code based on the security mechanism. For example, the generation system 22 may identify the security mechanism as a zip code and generate a rolling zip code for the user. The rolling zip code may be displayed on the mobile device 20 of the user and the user may enter the zip code into the POS system 12. The generation system 22 may also transmit the rolling zip code to the authentication system 18 to overwrite the actual zip code (e.g., zip code associated with billing address) associated with the payment 16. The authentication system 18 may receive the rolling zip code from the POS system 12 and the rolling zip code from the generation system 22, compare the two zip codes, and verify the transaction if the zip codes match. In another example, the generation system 22 may remit the payment 16 for a recurring transaction. As such, the generation system 22 may generate a token associated with the recurring transaction and periodically transmit both the payment 16 and the token to the authentication system 18. Additionally or alternatively, the generation system 22 may transmit the token to the vendor prior to the transaction or at a first transaction of the recurring transactions. In this way, the vendor may have token and verify the transaction based on the token rather than payment information.

The generation system 22 may include various types of components that may assist the generation system 22 in performing various types of computer tasks and operations. For example, the generation system 22 may include a communication component 24, a processor 26, a memory 28, a storage 30, input/output (I/O) ports 32, a display 34, an image sensor 36, and the like. The communication component 24 may be a wireless or wired communication component that may facilitate communication between the generation system 22 and various other computing systems via a network, the Internet, or the like.

The processor 26 may be any type of computer processor or microprocessor capable of executing computer-executable code. The processor 26 may also include multiple processors that may perform the operations described below.

The memory 28 and the storage 30 may be any suitable articles of manufacture that can serve as media to store processor-executable code, data, or the like. These articles of manufacture may represent computer-readable media (e.g., any suitable form of memory or storage) that may store the processor-executable code used by the processor 26 to perform the presently disclosed techniques. As used herein, applications may include any suitable computer software or program that may be installed onto the generation system 22 and executed by the processor 26. The memory 28 and the storage 30 may represent non-transitory computer-readable media (e.g., any suitable form of memory or storage) that may store the processor-executable code used by the processor 26 to perform various techniques described herein. Additionally or alternatively, the memory 28 may include one or more databases to store user information, payment information, tokens, codes, or the like. For example, the user may change a status of one or more tokens from the generation system 22 and the memory 28 may store such updates. In another example, the storage 30 may include one or more databases that store user information, payment information, tokens, codes, or the like. For example, the memory 28 and/or the storage 30 may include processor-executable code to display a graphical user interface (GUI) on the mobile device. As further described with respect to FIGS. 2, 3, and 6, the GUI may display information regarding the token, the code, the transaction, or the like. It should be noted that non-transitory merely indicates that the media is tangible and not a signal.

The I/O ports 32 may be interfaces that may couple to other peripheral components such as input devices (e.g., keyboard, mouse), sensors, input/output (I/O) modules, and the like. The display 34 may operate as a human machine interface (HMI) to depict visualizations associated with software or executable code being processed by the processor 26. In one embodiment, the display 34 may be a touch display capable of receiving inputs from a user of the generation system 22. The display 34 may be any suitable type of display, such as a liquid crystal display (LCD), plasma display, or an organic light emitting diode (OLED) display, for example. Additionally, in one embodiment, the display 34 may be provided in conjunction with a touch-sensitive mechanism (e.g., a touch screen) that may function as part of a control interface for the generation system 22. The image sensor 36 may be a sensor capable of acquiring image data. As such, the image sensor 36 may be a camera or other suitable image capturing device (e.g., scanner).

It should be noted that the generation system 22 should not be limited to include the components described above. Instead, the components described above with regard to the generation system 22 are examples, and the generation system 22 may include additional or fewer components relative to the illustrated embodiment. Furthermore, one or more components of the generation system 22 may be stored on a cloud server. For example, the memory 28 and/or the storage 30 may be stored in the cloud server and communicatively coupled to the generation system.

Figure 2:
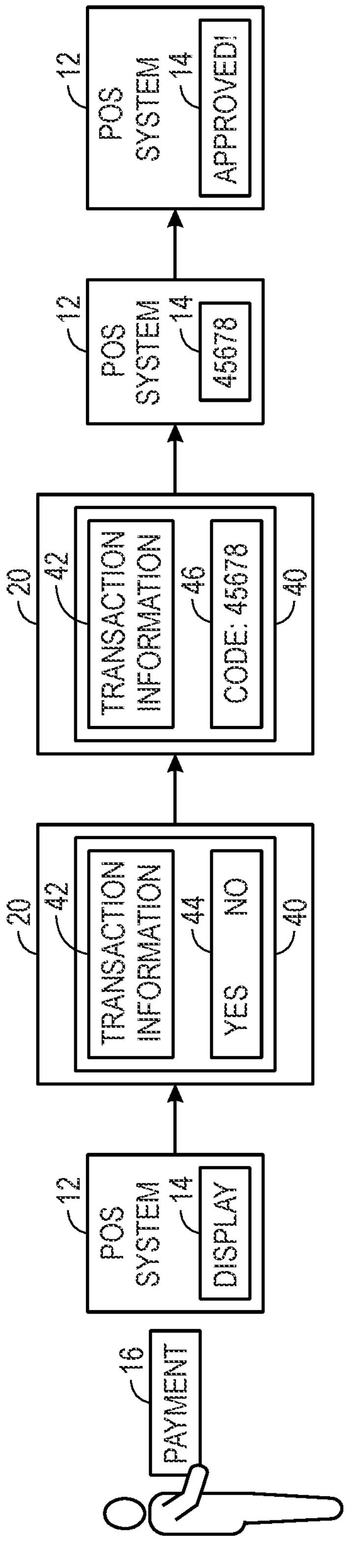
FIG. 2 is a schematic illustration the generation system of FIG. 1 providing a rolling code to verify the transaction, in accordance with an embodiment of the present disclosure.

FIG. 2 is a schematic illustration of the generation system 22 providing a rolling code for verifying the payment 16 and the transaction. For example, the user may visit a vendor (e.g., grocery store, retail store, restaurant) either in person or online to purchase goods or services. The user may visit the POS system 12 to complete the transaction. By way of example, the user may check out at the grocery store at the POS system 12 (e.g., kiosk). In another example, the user may check out on a website after adding goods into their online shopping cart. The POS system 12 may include the display 14 to display information regarding the transaction. For example, the POS system 12 may display the total cost, a payment type, personal information (e.g., billing address, shipping address), shipping options, or the like. After entering the payment 16, the POS system 12 may request additional payment information to complete the transaction. To verify the payment 16, the POS system 12 may request the zip code of the billing address of the user to verify the transaction. However, it may be beneficial to conceal the zip code from the POS system 12 to reduce, eliminate, or prevent theft or fraud.

The POS system 12 may include a security mechanism for verifying the payment 16. For example, a kiosk at a gas station may be limited in design (e.g., either in hardware and/or software) to request particular static types of data (e.g., a zip code) when using particular types of payment, to verify the payment 16. In certain instances, the POS system 12 may request a type of payment 16. For example, the type of payment 16 may include a credit card, a debit card, a gift card, a mobile payment service, and so on. Based on the payment type, the POS system 12 and/or the authentication system 18 may determine a security mechanism for verifying the transaction. For example, if the user selects a debit card as the payment type, then the POS system 12 may ask for a pin from the user. In another example, if the user selects credit card, then the POS system 12 may ask for a zip code associated with the billing address. In another example, if the user selects a mobile payment service, then the POS system 12 may ask for a CVV, a pin, a zip code, a signature, or the like.

The generation system 22 may receive an indication of the transaction from the vendor and send the rolling code to the mobile device 20. For example, the mobile device 20 may include a software application associated with the payment 16. The mobile device 20 may include authentication features (e.g., the image sensor 36 and the image sensor 36 may receive image data (e.g., user's face)) which, when authenticated, unlock the software application for the user to view the rolling code. As described herein, the mobile device 20 may be configured to receive push notifications or requests from the generation system 22 to verify the transaction. As illustrated, in some embodiments, the mobile device 20 may display a GUI 40 resulting from a push notification, the GUI 40 indicating the transaction information 42, and providing a button 44 configured for user input, or the like. For example, the transaction information 42 may indicate the vendor associated with the transaction, an amount of the transaction, a time or a date of the transaction. In some embodiments, the user may not receive an indication of rolling codes used to verify the transaction until an affirmative approval for the transaction is received. In such embodiments, the GUI 40 may display the button 44 requesting user input to approve or deny the transaction. For example, the user may receive the notification but may not have created the transaction. As such, the user may be alerted to fraudulent transactions and deny the transaction. In another example, the user may have created the transaction and therefore approve the transaction to receive the rolling code.

The GUI 40 may display the rolling code for the user to verify the transaction. As mentioned above, the code may, in some cases, be provided via a limited prompt of the POS system 12. Accordingly, the GUI 40 may provide an indication of a particular prompt of the POS system 12 where the rolling code should be entered (e.g., when the POS system 12 asks for zip code). As described herein, the POS system 12 may be communicatively coupled to the authentication system 18 to verify the transaction. The generation system 22 may generate the rolling code for the authentication system 18 based on the security mechanism. For example, if the security mechanism is a CVV, then the generation system 22 may generate a rolling CVV for verification. In another example, if the security mechanism is a zip code, then the generation system 22 may generate a rolling zip code. If the security mechanism is a pin, then the generation system 22 may generate a rolling pin. In this way, personal information of the user may be concealed from the POS system 12 and/or any unauthorized parties.

When the POS system 12 has capabilities to prompt for multiple types of information, the generation system 22 may select from the types of information, a type of information that is more dynamic or flexible than the other types of information. For example, a PIN, which may be changed by a user at any time without ramifications to other system other than adjusting authentication criteria may be more flexible/dynamic than a billing zip code that, when changed, may affect other non-authentication functions, such as mailing of communications, etc.

In certain instances, the GUI 40 may display the rolling code for the user to input into the POS system 12 to approve the transaction. The rolling code may include any suitable number of digits corresponding to the security mechanism. For example, the code may include three or four digits for a CVV. In another example, the rolling code may include six digits for a pin or two digits for a pin. Still in another example, the rolling code may include five digits for a rolling zip code. As illustrated, the user may receive a code, "CODE: 45678" to enter into the POS system 12. The rolling code may be a one-time code for verifying the associated the transaction. For example, the code may be a rolling zip code to conceal the billing zip code. In other instances, the rolling code may be a token that may be associated with a recurring transaction and the generation system 22 may transmit the token along with payment information.

In certain instances, the user may enter the rolling code into the POS system 12. For example, the user may use the display 14 to enter the rolling zip code and the POS system 12 transmit the code to the authentication system 18 for verification. If the authentication system 18 finds a match between the code supplied by the generation system 22 and the code supplied via the POS system 12, then the authentication system 18 may approve the payment for completion. The POS system 12 may receive an indication of approval of the transaction and may facilitate completion of the transaction and cause the display 14 to display an indication of a success payment. If the authentication system 18 does not approve the code, then the POS system 12 may deny the transaction. Additionally or alternatively, the authentication system 18 may transmit the rolling code to the vendor for verification. The generation system 22 may transmit the rolling code to the vendor. As such, the vendor may associate the rolling code with the transaction and verify the transaction. In this way, the user may hide their personal information from the POS system 12.

Figure 3:
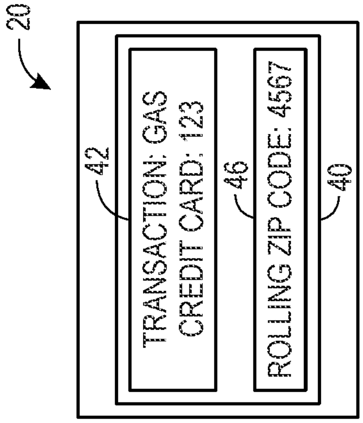
FIG. 3 is a schematic illustration of graphic user interface (GUI) displaying the code provided by the generation system of FIG. 1, in accordance with an embodiment of the present disclosure.

FIG. 3 is a schematic illustration of the GUI 40 displaying a code to verify a transaction. For example, the user may visit the POS system 12 to complete a transaction. In certain instances, the transaction may be a one-time transaction at a vendor. For example, the user may visit a bookstore, a grocery store, a restaurant, a clothing store, or the like to purchase goods. To complete the transaction, the user may enter the payment 16 at the POS system 12 associated with the vendor. For example, the user may enter a credit or debit card into the POS system 12.

To verify the user, the POS system 12 may request payment information, such as a zip code, a pin, a CVV, a signature or the like. As described herein, it may be beneficial to hide the payment information to reduce, eliminate, or prevent fraud. For example, the rolling code may be a one-time code that changes per transaction and used to conceal the payment information. The GUI 40 illustrates the notification that may be displayed on the mobile device 20.

The GUI 40 may display the transaction information 42 and the rolling code 46. For example, the transaction information 42 may include the type of the transaction and the payment 16. For example, the type of transaction may include a variety of purchases, such as gas, groceries, clothing, office supplies, home goods, food, or the like. The payment information may include a type of card, a number of the card (e.g., last four digits), a name of the card, or the like. As such, the user may identify the transaction being approved.

The GUI 40 may also provide the rolling code 46 associated with the transaction. For example, the rolling code 46 associated with the security mechanism may be provided by the generation system 22. As illustrated, the rolling code 46 may read "ROLLING ZIPCODE: 45678." In certain instances, the rolling code may change for each transaction. As such, the rolling code 46 may conceal the actual payment information used to verify the transaction. In other instances, the rolling code 46 may remain the same and change after a threshold period of time (e.g., one hour, one day, one week). For example, the rolling code 46 may change every hour.

Figure 4:
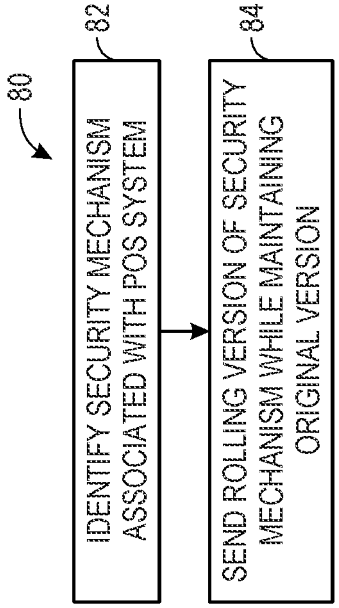
FIG. 4 is a flowchart of a process of the generation system of FIG. 1 identifying a security mechanism, in accordance with an embodiment of the present disclosure.

FIG. 4 is a flowchart of a process 80, which in some cases, may be implemented by the generation system 22. The process 80 generates and provides a rolling code for use in authenticating a transaction.

In certain instances, the rolling code 46 may change with each transaction. Additionally or alternatively, the rolling code 46 may change with each security mechanism needed to complete the transaction. For example, each type of payment may be associated with a different security mechanism. In another example, the POS system 12 and/or the authentication system 18 may be associated with a security mechanism. As such it may be beneficial for the generation system 22 to identify the security mechanism prior to generating the code. Further, different types of POS systems 12 may include design limitations that only facilitate particular types of information prompts. Accordingly, at block 82, the generation system 22 may identify a security mechanism associated with the POS system 12, the authentication system 18, and/or transaction type. The vendor may set the POS system 12 to request a type of security mechanism to verify the payment. For example, a POS system 12 at a gas station may request a zip code regardless of the payment 16. In another example, a POS system 12 at an online store may request a CVV regardless of the payment 16. As such, the generation system 22 may identify the security mechanism associated with the POS system 12. Additionally or alternatively, the generation system 22 may identify the type of payment 16 and identify the security mechanism associated with the type of payment 16.

At block 84, the generation system 22 may send a rolling version of the security mechanism while maintaining the original version. The generation system 22 may send the rolling code 46 to provide a stronger verification technique than simply matching a static zip code, CVV, or pin. For example, the POS system 12 may transmit a request for a zip code associated with the billing address and the generation system 22 may receive the request (via the payment fulfillment system 17) and generate a rolling zip code. The generation system 22 may transmit the rolling zip code for display on the mobile device 20 for the user to enter into the POS system 12. In another example, the POS system 12 may request a pin associated with a debit card. The payment fulfillment system 17 may receive the request and transmit the request to the generation system 22. In response to receiving the request, the generation system 22 may generate a rolling pin and transmit the rolling pin to the mobile device 20. Additionally or alternatively, the generation system 22 may transmit the rolling code to the payment fulfillment system 17 for verification. In this way, the generation system 22 may conceal payment information and reduce or eliminate fraud.

The generation system 22 may also send a rolling version of the security mechanism to the authentication system 18. As such, the authentication system 18 may receive the rolling code from the POS system 12 and the rolling code from the generation system 22 for comparison. In this way, fraudulent transactions related to service cards may be reduced or eliminated.

Although the process 80 is described in a particular order, it should be noted that the process 80 may be performed in any suitable order and is not limited to the order presented herein. It should also be noted that although each block is described as below in the process 80 as being performed by the generation system 22, the authentication system 18, or other suitable computing systems may perform the methods described herein.

Figure 5:
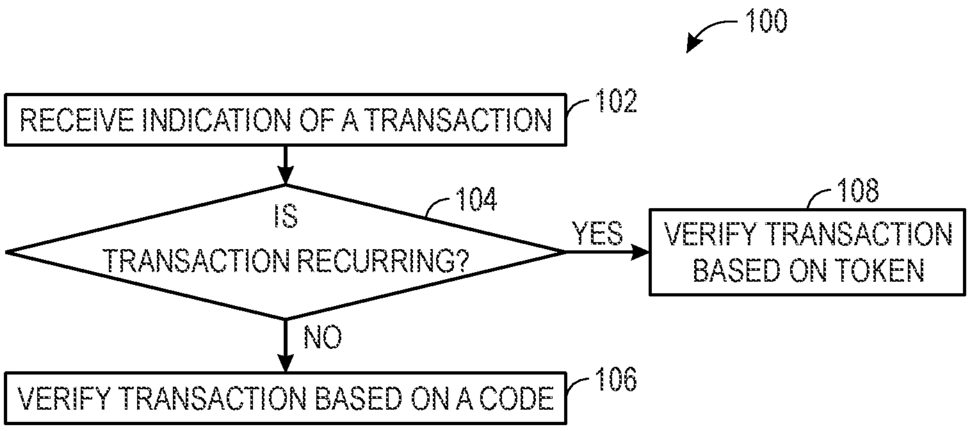
FIG. 5 is a flowchart of a process of the authentication system of FIG. 1 for identifying the type of transaction, in accordance with an embodiment of the present disclosure.

FIG. 5 is a flowchart of a process 100 for the authentication system 18 to verify the transaction based on a rolling code or a token. For example, the transaction may be a one-time transaction made at a vendor or the transaction may be a recurring transaction at a same vendor. In certain instances, the user may make a one-time transaction at a vendor to purchase goods or services. However, the user may have certain transactions that periodically reoccur. That is, payment may be made at a same time of the week, month, or year. The user may set up automatic payments for their utilities, subscription services, or the like. For example, the user may have their lawn mowed twice a month and set up automatic payments to the vendor. In another example, the user may have a streaming service and set up automatic payments at the beginning of each month. As may be appreciated, dynamically changing rolling codes used to validate transactions may be problematic in such situations, as the code may change with each payment, reducing the ability to automate recurring payments. Accordingly, as discussed herein, for recurring payments (e.g., periodic automated payments after an initial non-recurring payment), a token may be used for validation. Returning to our lawn moving example, an initial payment may be verified via the rolling code. When an indication recurring payments is also provided, a token may be generated and used to validate the subsequent automated payments. The token may be associated with automated payment characteristics, such as a particular payee, location, payment amount and/or payment range, payment frequency, payment date, and/or other characteristics that are permitted in automated payments. These associations may result in validated automated payments when an automated payment meets the automated payment characteristics and automated payment decline when the automated payment does not meet the automated payment characteristics.

At block 102, the authentication system 18 may receive indication of a transaction. For example, the authentication system 18 receive a request from the vendor for payment. In another example, the authentication system 18 may receive an indication from the entity associated with the payment 16 of the transaction. That is, the vendor may transmit a request for payment from an associated POS system 12 to the authentication system 18. The authentication system 18 may transmit the request to the generation system 22 and the generation system 22 may generate a rolling code or a token in response to receiving the request.

At block 104, the authentication system 18 may determine if the transaction is a recurring transaction (e.g., a transaction stemming from a previous transaction). For example, the authentication system 18 may receive an indication of a transaction from a gas station and identify the transaction as a one-time transaction. In another example, the authentication system 18 may receive an indication of a transaction from a subscription service and receive an indication that the transaction is part of a payment schedule for automated payments. As such, the authentication system 18 may identify the transaction as a recurring transaction.

If the transaction is not a recurring transaction, then the user may verify a rolling code, as discussed above. At block 106, the authentication system 18 may verify the transaction based on a rolling code. The generation system 22 may generate the rolling code and transmit the rolling code to the mobile device 20 of the user and the authentication system 18. The authentication system 18 may receive the rolling code from both the generation system 22 and the POS system 12. The authentication system 18 may verify the transaction based on the rolling code. For example, the authentication system 18 may determine if the received rolling code matches a rolling code entered by the user on the display 14 of the POS system 12.

If the transaction is a recurring transaction, then for automation of the payment, it may be desirable for the user not to have to manually input a rolling code. Thus, at block 108, the authentication system 18 may verify the transaction based on a token. For recurring transactions, the generation system 22 may generate a token and associate the token with the recurring transaction. The token may be any suitable data. In this way, the authentication system 18 may associate the token with the recurring transaction, enabling the token to be used to be used to validate the transaction. The data of the token may remain the same or may be changed after a threshold period of time (e.g., one week, one month, one year). For example, the data of the token may change periodically and be re-issued to the payment system to prevent theft or fraud.

Although the process 100 is described in a particular order, it should be noted that the process 100 may be performed in any suitable order and is not limited to the order presented herein. It should also be noted that although each block is described as below in the process 100 as being performed by the authentication system 18, other suitable computing systems may perform the methods described herein.

Figure 6:
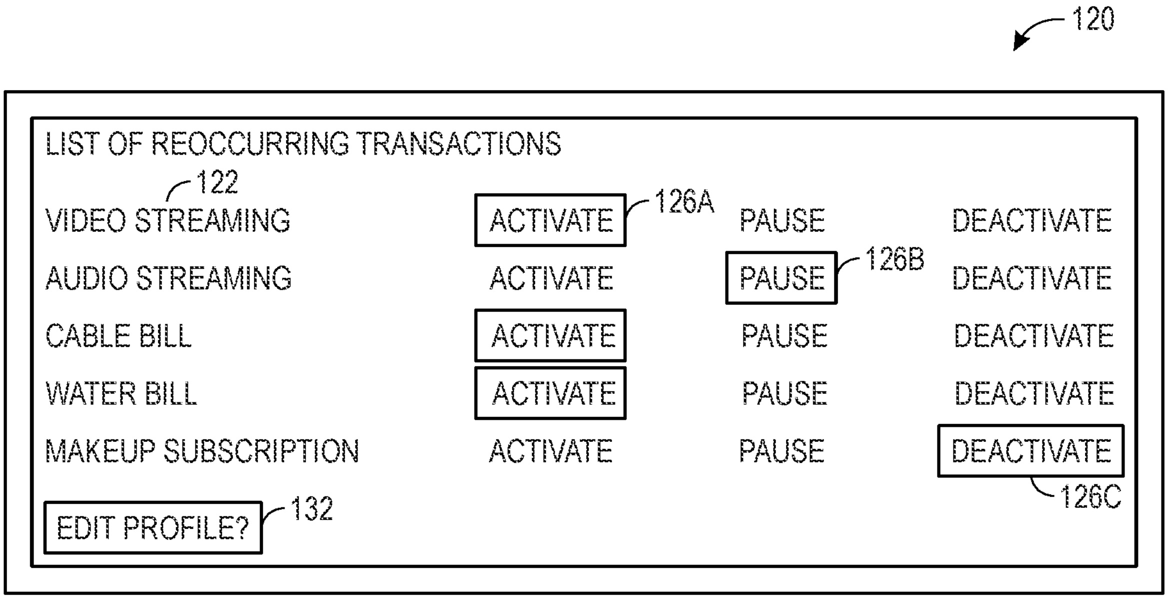
FIG. 6 is a schematic illustration of a GUI displaying one or more tokens stored by the generation system of FIG. 1, in accordance with an embodiment of the present disclosure.

Having discussed validation of recurring transactions using tokens, the discussion continues by detailing recurring payment management that may be facilitated via these tokens. FIG. 6 illustrates a GUI 120 illustrating one or more automated payments tracked by tokens generated by the generation system 22. As mentioned above, the tokens may be used to verify one or more recurring transactions. The user may have multiple recurring transactions, where a different token provides validation for each different set of recurring transactions (e.g., where each set includes all recurring transactions stemming from a particular initial transaction).

One benefit of the token-based validation of these sets of transactions is that the user may use the GUI 120 to view and/or change the state (e.g., active, pause, deactivate) of the tokens, providing a quick indication of recurring transactions that currently exist and an easy mechanism for modifying implementation of these recurring transactions (e.g., by temporarily pausing/suspending and/or permanently deactivating permission to implement particular sets of recurring transactions). Indeed, for each token generated for a set of recurring transactions, an entry may be provided in the GUI 120. The temporarily pause/suspend a set of transactions, a pause affordance may be selected, causing the associated token to temporarily not validate the set of recurring transactions (e.g., by flipping an associated status bit or inserting a pause date range indicating that the token should not validate transactions (e.g., for the paused date range, when specified) in a data repository storing the generated token). Similarly, to deactivate a set of recurring transactions, a deactivation affordance may be selected, which may cause the token to no longer validate the set of recurring transactions, even when the payment system provides the token for authentication. This may be done by setting a deactivation status bit or, in some embodiments, completely deleting the token from the repository storing the generated token.

For example, the GUI 120 may include a list of recurring transactions 122 and a state of the token 126*a-c*. As illustrated, the user may have a video streaming service with monthly transactions. The amount of the transaction may remain constant from month to month. As such, the generation system 22 may remit the same amount each month for payment along with the token. The token may be in an active state 126*a*. Additionally or alternatively, the user may have active tokens for their cable bill and/or water bill. In certain instances, transaction may have a different amount each month. For example, the amount for the water bill may change from transaction to transaction. The generation system 22 may receive the water bill, identify an amount of the water bill, and remit payment according to the amount. The generation system 22 may also remit the associated token to the vendor. The vendor may store the token information and accept the token as an alternative to payment information.

In another example, the user may have an audio streaming service. The user may choose to pause the subscription and indicate to the generation system 22 not to remit payment while the token is in the paused state 126*b*. In certain instances, the user may indicate an amount of time to pause the payment, such as 1 month, 2 months, 6, months, 8 months, and so on. In other instances, the user may indefinitely pause the token until a subsequent user input.

Still in another example, the user may choose to deactivate 126*c* one or more tokens. For example, the user may decide to stop or cancel a recurring transaction. As illustrated, the user may have a make-up subscription that has a recurring transaction. The user may cancel the subscription and stop recurring transactions. The user may deactivate 126*c* the token associated with the make-up subscription and the generation system 22 may receive the indication and change the state of the associated token to deactivate.

The GUI 120 may include a button 128 for editing a profile. For example, the user may create a profile within the software application with personal information. The user may enter a billing address, a payment information, a bank information, a digital wallet, or the like. For example, the user may enter current billing information associated with a credit or debit card. In another example, the user may have a digital wallet and enter information related to their cryptocurrency. However, the user may move or update their payment information (e.g., remove card, add card, increase cryptocurrency, decrease cryptocurrency). As such, it may be beneficial to update their profile such that the generation system 22 may remit payment to the POS system 12.

Figure 7:
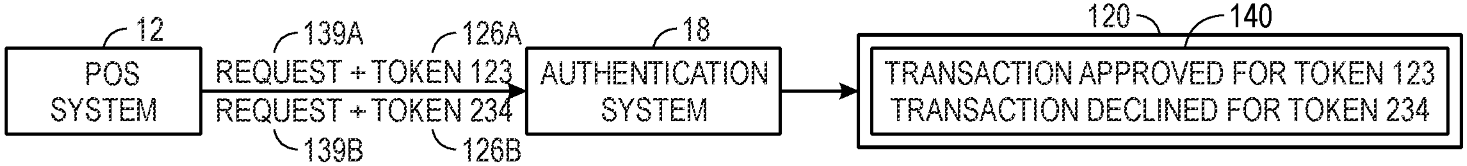
FIG. 7 is a schematic illustration of the authentication system of FIG. 1 verifying a token for a recurring transaction, in accordance with an embodiment of the present disclosure.

FIG. 7 is a schematic illustration of the POS system 12 transmitting request for payment to the authentication system 18. For example, the user may set up recurring transactions with a vendor (via the POS system 12). The recurring transactions may occur at a same time each week, each month, each year, and so on. Additionally or alternatively, the user may set up recurring transactions to occur on a certain day. For example, the transaction may occur twice a month or twice a year rather than once a month. As such, the POS system 12 may request payment and the token on a due date of the recurring transactions.

An initial transaction may be validated via a rolling code, where an indication that recurring payments spawning from the initial transaction will occur in the future. The indication may include an indication of other permitted transaction characteristics, such as frequency of the recurring transactions, a date range when the recurring transactions will occur, permitted payees of the recurring transactions, payment value ranges for the recurring transactions, etc. In response, the generation system 22 may generate a token associated with an indication of the expected recurring payment type and recurring payment characteristics and send this information to the authentication system 18. The generation system 22 may also transmit the token to system that will provide the recurring payments, such that that the token may be remitted with the subsequent recurring transaction requests for authentication by the authentication system 18.

A subsequent request for payment for the recurring transaction may be provided to the authentication system 18. The payment request 139 and the associated token provided for remission with the recurring transaction request are provided to the authentication system 18. For example, a first token (e.g., TOKEN123) 126A associated with a first recurring transaction 139A and a second token (e.g., TOKEN234) 126B associated with a second recurring transaction 139B may be provided to the authentication system 18.

The authentication system 18 may authenticate the recurring payment request by determining whether the token 126 supplied by the request matches a token supplied by the generation system 22 that is associated with a common expected payment type and payment characteristics.

Further, the authentication system 18 may check for a token status to determine whether the token is currently active (e.g. permitted for use in authenticating a payment request). In certain instances, the authentication system 18 may be coupled to a database and retrieve a state of the token from the database. In other instances, the token 126 may include the state as part of its payload data. For example, the TOKEN123 126A may include an active state and the authentication system 18 may authorize the payment. In another example, the TOKEN234 126B may be temporarily paused, as such the authentication system 18 may not authorize the payment. Still in another example, the TOKEN 234 126B may be deactivated, as such the authentication system 18 may not authorize the transaction.

The authentication system 18 may approve or deny the transaction requests based upon whether a matching token/transaction type/transaction characteristics are found and whether the matching token is currently active. The authentication system 18 may send an indication the POS system 12 indicating whether the transaction request is approved and/or denied and may cause the transactions to either be implemented or declined based upon the transaction requests being approved or denied, respectively. The indication of the approval or denial of the transaction requests may be provide to the transaction requestor device (e.g., the mobile device 20) where the indication may be displayed. For example, the GUI 140 illustrates the status of transactions associated with TOKEN123 126A and TOKEN234 126B. For example, the transaction associated with TOKEN123 126A may be approved since the token 126 is activate and the transaction associated with TOKEN234 126B may not be approved since the token 126 is inactive (e.g., paused and/or deactivated).

Figure 8:
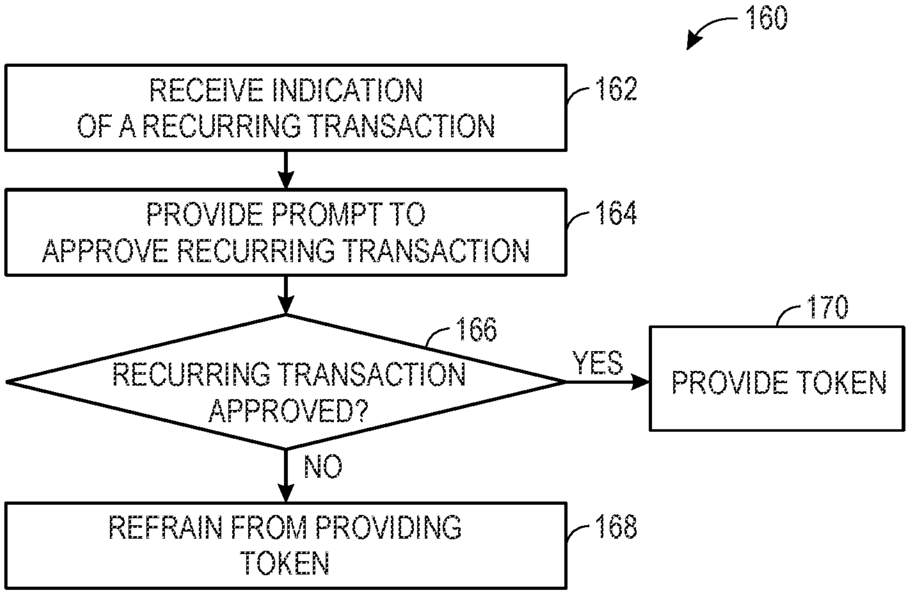
FIG. 8 is a flowchart of a process of the generation system of FIG. 1 for providing a token for a recurring transaction, in accordance with an embodiment of the present disclosure.

FIG. 8 is a flowchart of a process 160 for providing a token to verify a recurring transaction. For example, the generation system 22 may provide a single token for use with each payment for the recurring transaction. The vendor may store a copy of the token and, upon requesting a payment, may provide the token to the authentication system 18, which compares the received token with its tokens to verify the transaction. If the received token matches a stored token associated with the requested transaction type and transaction characteristics, then the authentication system 18 may approve the transaction. If the received token does not match the copied token, then the authentication system 18 may deny the transaction. In this way, service card fraud may be reduced, eliminated, or prevented.

At block 162, an indication of a recurring transaction may be received. For example, the user may input a recurring transaction using the GUI 120 described with respect to FIG. 6 and input schedule for subsequent transactions. In another example, the user may visit the POS system 12 for a transaction and the authentication system 18 may receive a payment request from the POS system 12. The POS system 12 may transmit an indication of subsequent payment dates and a payment amount. For example, transaction may be for a streaming service and request a consistent payment amount each month.

At block 164, a prompt may be provided to requesting approval of the recurring transaction. The authentication system 18 may transmit the payment request to the generation system 22. The generation system 22 may push a notification to the mobile device 20 to notify the user of the recurring transaction, such as the GUI 40 described with respect to FIG. 3. In another example, the generation system 22 may be communicatively coupled to the POS system 12 and receive an indication of a transaction from the POS system 12. The generation system 22 may compare the indication (e.g., a recurring transaction) with the list of recurring transactions stored in the memory 28 and/or the storage 30. If the indication does not match a transaction in the list of recurring transactions, then the generation system 22 may provide a prompt to approve the received recurring transaction. As such, the user may be notified of transactions prior to payment.

At determination block 166, a determination is made as to whether the recurring transaction is approved. For example, the generation system 22 may display the GUI 40 described with respect to FIG. 3 and receive an indication (e.g., user input) of not approving the transaction. In another example, the generation system 22 may identify the received recurring transaction in the list of recurring transactions and transmit an indication of the identification to the authentication system 18.

If the recurring transaction is not approved, then at block 168 there is a refrain from providing the token to the authentication system 18 (e.g., by the generation system 22).

Additionally or alternatively, payment 16 may not be provided to the authentication system 18 based on the generation system 22 determining the transaction is not approved. As such, fraudulent transactions may be reduced, eliminated, or prevented.

If the recurring transaction is approved, then at block 170, the token may be provided to the authentication system 18 for subsequent transaction request authentication (e.g., by the generation system 22). In certain instances, the generation system 22 may generate the token and provide the token to the authentication system 18 for storage. In other instances, the generation system 22 may generate a token and store the token in the memory 28 or the storage 30. As such, the generation system 22 may retrieve the token and transmit the token to the authentication system 18.

Although the process 160 is described in a particular order, it should be noted that the process 160 may be performed in any suitable order and is not limited to the order presented herein. It should also be noted that although each block is described as below in the process 160 as being performed by the generation system 22 other suitable computing systems may perform the methods described herein.

Figure 9:
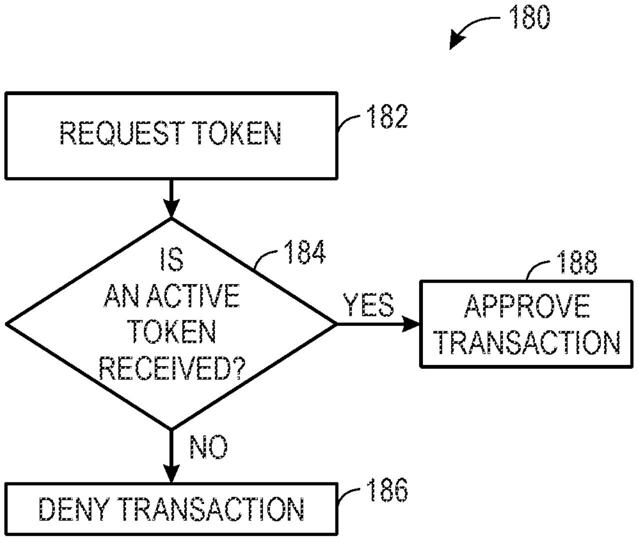
FIG. 9 is a flowchart of a process of the authentication system of FIG. 1 for verifying a transaction based on a state of the token, in accordance with an embodiment of the present disclosure.

FIG. 9 is a flowchart of a process 180 to verify the recurring transaction based on the state of the token 126. For example, the authentication system 18 may verify a transaction based on a state (e.g., active, inactive, paused) of the token 126. For example, the POS system 12 may request payment information for the recurring transaction from the authentication system 18. The authentication system 18 may transmit the request to the generation system 22 and the generation system 22 may remit the token. The authentication system 18 may verify the transaction based on the token and/or the state of the token 126. If the token is active, then the authentication system 18 may remit payment to the POS system 12. If the token is not active, then the authentication system 18 may not remit payment. As such, unauthorized transactions may be reduced or eliminated.

At block 182, the authentication system 18 may request a token from the generation system 22. For example, the authentication system 18 may send an indication of the recurring transaction and a request for the token associated with the recurring transaction. The authentication system 18 may store a copy of the token in a database and the associated transaction. In this way, the authentication system 18 may verify subsequent transactions based on the token. In an embodiment, the authentication system 18 may not request the token from the generation system 22, rather the generation system 22 may provide the token and the authentication system 18 may optionally receive the token. In another embodiment, the authentication system 18 may store the token and request a status of the token from the generation system 22. Based on the status of the token, the authentication system 18 may verify the recurring transaction.

At block 184, the authentication system 18 may determine if an active token is received from the generation system 22 and/or the POS system 12. The authentication system 18 may receive the token from the generation system 22 and determine the state of the token 126. In another example, the authentication system 18 may receive a token from the POS system 12 and an indication of the recurring transaction. The authentication system 18 may compare the token from the POS system 12 to a list of tokens (described with respect to FIG. 6). For example, the token may be active. In another example, the user may change the state of the token 126 from active to inactive (e.g., pause, deactivate). If the authentication system 18 does not receive a token for the recurring transaction, then the authentication system 18 may not approve the transaction. If the token is paused (e.g., temporarily deactivated) and/or inactive, then the authentication system 18 may not verify the recurring transaction. If the token is active and associated with the transaction, then the authentication system 18 may be able to verify the recurring transaction and approve the transaction.

If the authentication system 18 does not receive an active token associated with the recurring transaction request, then at block 186, the authentication system 18 may deny the recurring transaction request. For example, the token 126 may be temporarily paused (e.g., by the user using a token 126 of FIG. 6). As such, the authentication system 18 may not approve the transaction request based on the state of the token 126. In another example, the token may be deactivated (e.g., by the user using affordance 126A of FIG. 6). The inactive token may cause the authentication system 18 to deny the transaction request. In certain instances, the authentication system 18 and/or the generation system 22 may push a notification to the mobile device 20 to alert the user of the declined transaction request.

If the authentication system 18 does receive an active token associated with the recurring transaction request, then at block 188, the authentication system 18 may approve the transaction and the POS system 12 may process the payment 16 and the transaction may be completed.

Although the process 180 is described in a particular order, it should be noted that the process 180 may be performed in any suitable order and is not limited to the order presented herein. It should also be noted that although each block is described as below in the process 180 as being performed by the generation system 22, the authentication system 18, or other suitable computing systems may perform the methods described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, via a processor, an indication of a transaction request comprising a request for payment information via a payment system;

instructing, via the processor, an electronic device to display a prompt to approve the transaction request;

in response to receiving an indication of approving the transaction request based upon the prompt, generating, via the processor, a token comprising a temporary value for the payment information that is different than an actual value of the payment information, the temporary value being formatted as the actual value of the payment information expected by the payment system and usable to satisfy an unchanged legacy prompt of the payment system;

providing, via the processor, the token to an authentication system in place of the payment information;

approving, via the processor, the transaction request in response to determining an inputted value matches the token; and declining, via the processor, the transaction request in response to determining the inputted value does not match the token.

2. The method of claim 1, comprising:

receiving, via the processor, a second indication of a second transaction request comprising a request for the payment information;

determining, via the processor, the second transaction request is a recurring transaction; and identifying, via the processor, a respective token of a plurality of tokens corresponding to the second transaction request.

3. The method of claim 2, comprising:

generating, via the processor, the token in response to determining a state of the token is active.

4. The method of claim 2, comprising: instructing, via the processor, the electronic device to display a notification of a declined transaction in response to determining a state of the token is inactive.

5. The method of claim 1, comprising: identifying, via the processor, a type of the payment information requested in response to receiving the transaction request; and generating, via the processor, the token based on the type of payment information requested.

6. The method of claim 1, comprising: generating, via the processor, a second token comprising a second temporary value different from the temporary value in response to receiving a second indication of a second transaction request.

7. A system comprising:

a generation system configured to:

receive an indication of a transaction comprising a request for payment in formation from a payment system;

generate a token comprising a temporary value that is different from an actual value of the payment information and that is formatted in a specific format of the payment inf formation requested by the payment system so as to satisfy an unchanged legacy prompt of the payment system to complete the request, while also maintaining, in a separate storage field, the actual value of the payment information; and provide the token an authentication system and an electronic device of an initiator of the transaction; and the authentication system configured to authenticate the transaction request by:

receiving an inputted value in the specific format from the payment system via the legacy prompt;

approving the transaction request when the inputted value matches the temporary value; and declining the transaction request when the inputted value does not match the temporary value.

8. The system of claim 7, wherein the token comprises an one-time code, a retrofit code, or both, and wherein the payment information comprises a card verification value (CVV) associated with a physical payment card, a zip code associated with the initiator, a pin of the initiator, or any combination thereof.

9. The system of claim 7, wherein the generation system is configured to not provide the token to the authentication system in response to declining the transaction request.

10. The system of claim 7, wherein the generation system is configured to: determine a type of payment information being requested; and generate the token based on the type of payment information.

11. The system of claim 7, wherein the authentication system is configured to authenticate a recurring transaction without remittance of the token from the payment system, based upon the subsequent recurring transaction requests meeting criteria associated with a token stored at the authentication system.

* * * * *